Aug. 27, 1935.  G. H. LELAND  2,012,688
MOUNTING FOR MOTORS AND THE LIKE
Filed Oct. 16, 1933
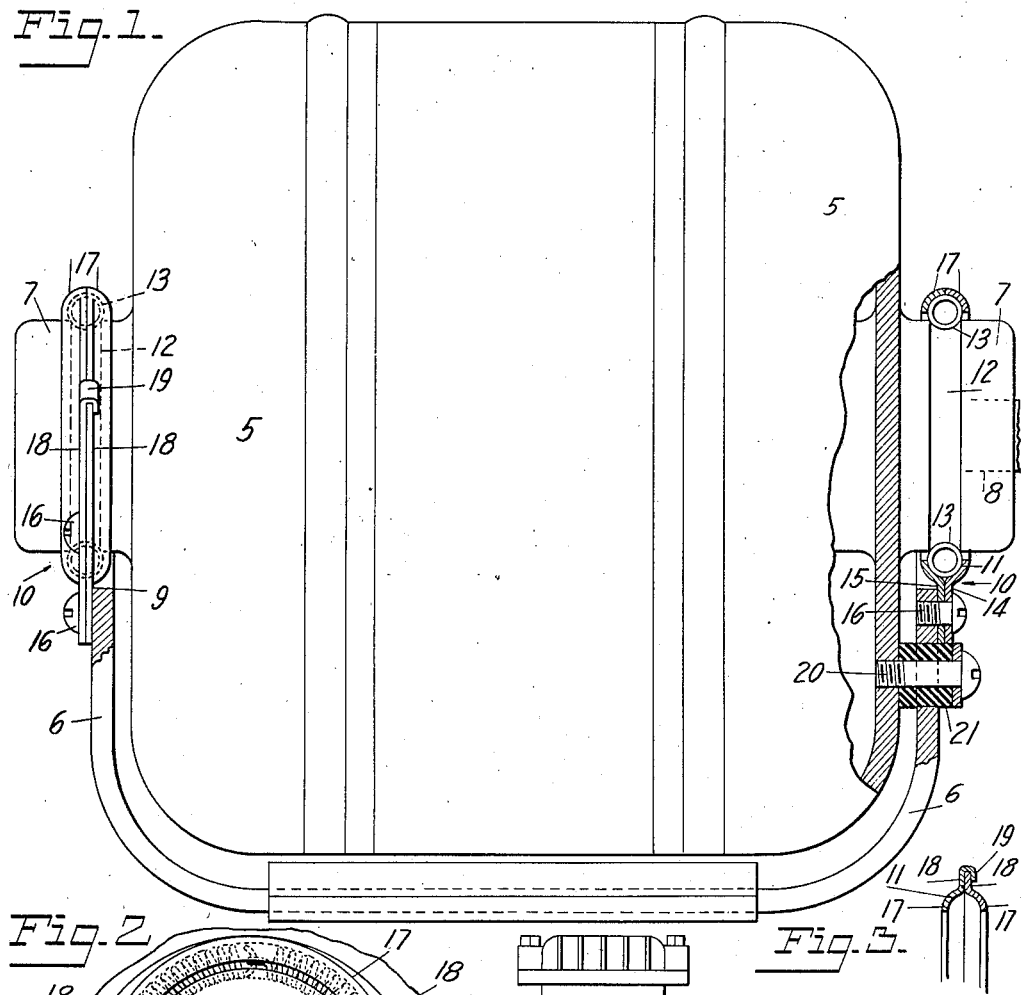
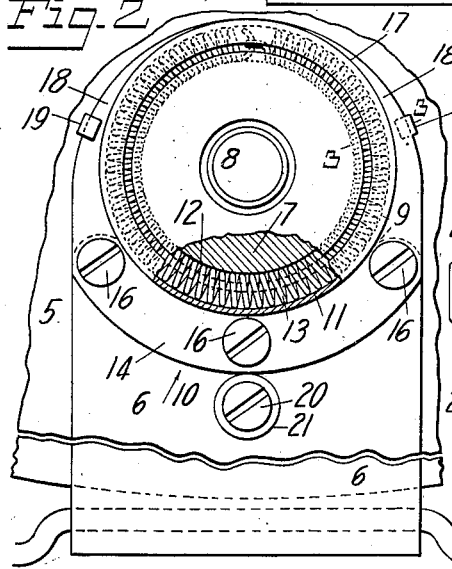
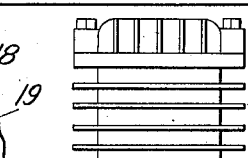
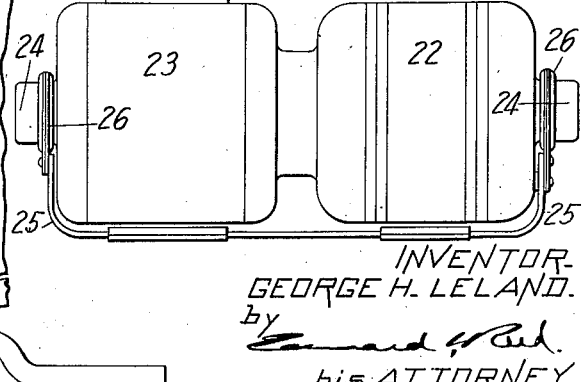
INVENTOR
GEORGE H. LELAND
by
his ATTORNEY Patented Aug. 27, 1935

2,012,688

UNITED STATES PATENT OFFICE 2,012,688

MOUNTING FOR MOTORS AND THE LIKE

George H. Leland, Dayton, Ohio, assignor of one-half to The Leland Electric Company, Dayton, Ohio, a corporation of Ohio Application October 16, 1933, Serial No. 693,782

5 Claims. (Cl. 248—26)

This invention relates to a mounting for motors and the like and more particularly to a vibration absorbing mounting adapted to be interposed between a motor frame and the supporting device therefor.

In the operation of motors of some types torsional vibration is set up in the motor frame or casing and where the frame is directly mounted on the supporting device this vibration is transmitted through the supporting device to the structure on which the latter is mounted and produces a noise which is very objectionable. In Patent No. 1,790,159, granted to Leland and George on January 27, 1931, there is shown a mounting for such a motor which is adapted to absorb vibrations and either eliminate the noise altogether or reduce it to a minimum but in that construction the supporting members extend into the frame of the motor and the vibration absorbing element is interposed between the inner end of the supporting member and an interior part of the frame. This construction is entirely satisfactory for motors of the type there shown but it cannot be used with motors having a frame or casing which is closed or sealed against the entrance of dust, gases or the like.

One object of the present invention is to provide a vibration absorbing mounting of such a character that it may be interposed between exterior parts of the frame and its supporting device.

A further object of the invention is to provide such a mounting which can be quickly and easily assembled in the motor and when so assembled will be of a strong durable character.

Other objects of the invention will appear as the device is described in detail.

In the accompanying drawing Fig. 1 is an elevation, partly in section, of a motor embodying my invention; Fig. 2 is an end elevation of such a motor, partly broken away; Fig. 3 is a transverse section taken on the line 3—3 of Fig. 2; and Fig. 4 shows the invention applied to an apparatus embodying a plurality of units.

In this drawing I have illustrated one embodiment of my invention and have shown the same as applied to a motor of a well known type. It will be understood, however, that the mounting may take various forms and may be applied to motors or similar devices of various kinds.

In that embodiment illustrated in Figs. 1 to 3 the motor comprises a closed frame or casing 5 which is mounted between upright supporting members 6, which, in the present instance, form part of a base. The motor casing is provided at each end with outwardly extending parts 7 which are preferably cylindrical in form and through which the motor shaft 8 extends. The upright supporting members 6 are arranged close to the ends of the motor frame and beneath the outwardly extending parts 7 thereof and are spaced from the parts 7 of the frame. The upper ends of the supporting members may take various forms and, in the present construction, the upper ends of these members are recessed as shown at 9 so that the sides of each supporting member extend above the bottom of the outwardly extending part of the motor frame. Mounted on each upright supporting member 6 is a device 10 adapted to support a vibration absorbing element in engagement with the outwardly extending part of the motor frame. Preferably this device extends entirely about the adjacent outwardly extending part 7 of the frame and an annular vibration absorbing member is interposed between the opposed surfaces of the device 10 and of the part 7 of the frame. In the construction here shown that part of the device 10 which extends about the part 7 of the frame is provided with an internal groove 11 and the part 7 is provided with an exterior groove 12 arranged in opposed relation to the groove 11. The vibration absorbing element may take various forms but it is here shown as an annular helical spring 13 mounted in opposed grooves 11 and 12 and having individual coils of a diameter somewhat greater than the combined depth of the two grooves so that it will support the part 7 of the frame out of engagement with the device 10. In the construction shown, the grooves are of a width approximately equal to the diameter of the individual coils of the spring and hence the springs also act as a locking device to hold the motor frame against axial movement with relation to the supporting member 6. Preferably the ends of the spring 13 are connected one to the other and the spring is of such a length that when seated in the groove 12 it will be placed under a tension sufficient to slightly separate the coils thereof, as clearly shown in Fig. 2.

The device 10 is preferably formed in two or more parts which may be separated to facilitate the assembly of the mounting in the motor. As here shown, this device comprises two members 14 and 15, preferably formed from plates of sheet metal, having their lower portions flat and arranged face to face, and these flat portions of the members 14 and 15 are rigidly connected one to the other and to the upright members 6 by screws 16. Each member, 14 and 15, has an annular portion 17 extending about the outwardly projecting part of the frame. These annular portions of the device diverge toward the part 7 of the frame so as to form in the device 10 a groove extending circumferentially of the part 7 of the frame. In the present instance, the diverging parts of the two members are curved so as to form a groove which is substantially semicircular in cross section. Means are also provided for connecting together the upper parts of the annular portions of the members 14 and 15 and this connecting means preferably is in the form of cooperating parts which are adapted to be moved into interlocking engagement by the relative rotation of the two members. In the construction illustrated those parts of the members 14 and 15 in which the annular portions are formed, have their upper ends rounded on such a radius that the lateral edges of the members merge into the annular portions 17 near the top thereof, thus providing each annular portion with tapered flanges 18. One flange of the annular portion of each member is provided with a hook-like part 19 spaced some distance from the top thereof and so arranged that when the two members are rotated in opposite directions the hook-like part 19 of each member will be moved beyond the end of the tapered end of the adjacent flange of the other member, thus permitting the hook-like part to be moved into line with said flange. By then rotating the two members in opposite directions the hook-like parts are caused to engage the tapered flange and firmly connect the two members. After this is done the two members are rigidly connected one to the other and to the uprights 6 by inserting the screws 16.

The motor frame is held against rotation with relation to the supporting member 6 by means of a yieldable stop which is here shown as comprising a stud 20 mounted in the end wall of the frame, extending through an opening in one of the upright members 6 and having mounted thereon, within the opening, a sleeve 21 of yieldable material, such as rubber, which will prevent the vibrations from being transmitted from the stud to the upright member.

As has been stated the invention may be applied to devices of various kinds and it is not limited in its use to a motor alone. In Fig. 4 I have illustrated the invention as applied to a mechanism comprising a motor 22 and a compressor 23 directly connected with the motor, the frames of the two units being rigidly connected one to the other and constituting in effect a single frame or structure. This structure has at its ends outwardly extending parts 24 arranged above upright supporting members 25, between which the structure is mounted, and the mounting is arranged about this outwardly extending part and secured to the upright members, as shown at 26, in the same manner as illustrated in Fig. 1.

While I have shown and described one embodiment of my invention, together with a minor modification thereof, I wish it to be understood that I do not desire to be limited to the details thereof as various modifications may occur to a person skilled in the art.

Having now fully described my invention, what I claim as new and desire to secure by Letters Patent, is:

1. In a motor or the like comprising upright supporting members spaced one from the other, and a frame arranged between said upright members and having parts extending outwardly across the same, a device mounted on each of said upright members exteriorly of said frame and extending about the adjacent outwardly extending part of said frame, said device and said part of said frame having opposed circumferential grooves, the grooved portion of said device comprising two separable parts, means for rigidly securing the two parts of said device one to the other and to said upright member, and a vibration absorbing element mounted in said grooves and supporting said part of said frame out of engagement with said device.

2. In a motor or the like comprising upright supporting members spaced one from the other, and a frame arranged between said upright members and having parts extending outwardly across the same, a device mounted on each of said upright members and extending about said part of said frame, said device comprising two members arranged face to face and having those edge portions adjacent to said part of said frame diverging toward said part of said frame to provide said device with a groove extending about said part of said frame, said part of said frame having a groove arranged in opposed relation to the groove in said device, and a vibration absorbing element mounted in said opposed grooves and supporting said part of said frame out of engagement with said device.

3. In a motor or the like comprising upright supporting members spaced one from the other, and a frame arranged between said upright members and having parts extending outwardly across the same, a device mounted on one of said upright members and comprising two members arranged face to face and having axially alined annular portions extending about and diverging toward the adjacent outwardly extending part of said frame to provide said device with a groove extending circumferentially of said part of said frame, said annular portions having cooperating parts arranged to be brought into interlocking engagement by the relative rotation of said annular portions, means for detachably securing the two members of said device one to the other and to said upright member, said part of said frame having a circumferential groove arranged in opposed relation to the groove in said device, and an annular vibration absorbing element mounted in said opposed grooves and supporting said part of said frame out of engagement with said device.

4. In a motor or the like comprising upright supporting members spaced one from the other, and a frame arranged between said upright members and having parts extending outwardly across the same, a device mounted on one of said upright members and comprising two members having flat portions arranged face to face and having axially alined annular portions extending about and diverging toward the adjacent outwardly extending part of said frame, said annular portions having tapered flanges arranged exteriorly thereof and each annular portion having a hook-like part arranged to be moved into overlapping engagement with the tapered flange of the other annular portion by the relative rotation of said members, means for detachably securing the flat portions of the two members of said device one to the other and to said upright member, said part of said frame having a circumferential groove arranged in opposed relation to the groove in said device, and an annular vibration absorbing element mounted in said opposed grooves and supporting said part of said frame out of engagement with said device.

5. In a motor or the like, a frame having at one end an outwardly extending circular part provided with a circumferential groove, a supporting member transverse to the axis of said part of said frame, a device carried by said member and having two parts provided with alined openings to receive said part of said frame and shaped to form between them a groove opposed to the groove in said part of said frame, said parts of said device having interlocking portions to detachably connect the same one to the other, and an annular vibration absorbing member mounted in said grooves.

GEORGE H. LELAND.